United States Patent
Fukushima

(10) Patent No.: US 10,440,286 B2
(45) Date of Patent: Oct. 8, 2019

(54) IMAGE CAPTURE CONTROL APPARATUS AND CONTROL METHOD THEREOF

(71) Applicant: CANON KABUSHIKI KAISHA, Tokyo (JP)

(72) Inventor: Yuki Fukushima, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 122 days.

(21) Appl. No.: 15/710,276

(22) Filed: Sep. 20, 2017

(65) Prior Publication Data
US 2018/0091722 A1    Mar. 29, 2018

(30) Foreign Application Priority Data
Sep. 27, 2016   (JP) .................. 2016-188756

(51) Int. Cl.
| H04N 5/235 | (2006.01) |
| H04N 5/232 | (2006.01) |
| H04N 5/77  | (2006.01) |

(52) U.S. Cl.
CPC ....... H04N 5/2354 (2013.01); H04N 5/23219 (2013.01); H04N 5/23293 (2013.01); H04N 5/232127 (2018.08); H04N 5/232935 (2018.08); H04N 5/772 (2013.01)

(58) Field of Classification Search
CPC ........... H04N 5/2354; H04N 5/232935; H04N 5/23219; H04N 5/232127; H04N 5/23293; H04N 5/772
See application file for complete search history.

(56) References Cited

U.S. PATENT DOCUMENTS

| 2006/0127080 A1* | 6/2006  | Mori     | H04N 5/23245 396/121 |
| 2008/0143866 A1* | 6/2008  | Nakahara | H04N 5/23212 348/345 |
| 2009/0268048 A1* | 10/2009 | Matsuno  | G03B 7/28 348/222.1 |
| 2010/0033593 A1* | 2/2010  | Sasaki   | H04N 5/23212 348/222.1 |

FOREIGN PATENT DOCUMENTS

JP    2009-017121 A    1/2009

* cited by examiner

Primary Examiner — Nhan T Tran
(74) Attorney, Agent, or Firm — Cowan, Liebowitz & Latman, P.C.

(57) ABSTRACT

An apparatus comprises a finder configured for observing an optical image of an object, a display having a plurality of items that overlap with the optical image and are observable through the finder, and capable of switching whether to light up the items or not, a detection unit which detects a specific object in the optical image, and a control unit which performs control to light up, in the display, an item indicating a position for performing specific processing, among the plurality of items, light up the item in a first form, when the specific object is not detected, and light up the item in a second form in which visibility of the specific object is greater than when lighting up the item is the first form, when the specific object is detected.

17 Claims, 8 Drawing Sheets

FIG. 4A
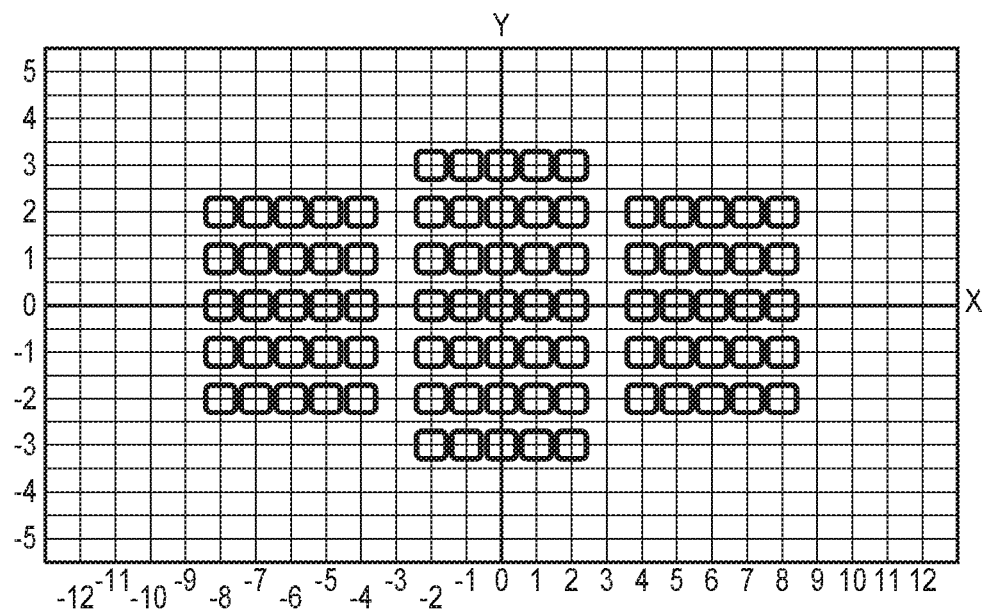
FIG. 4B    FIG. 4C    FIG. 4D
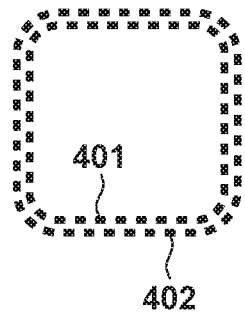 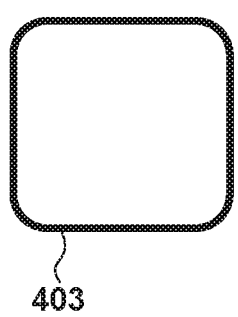 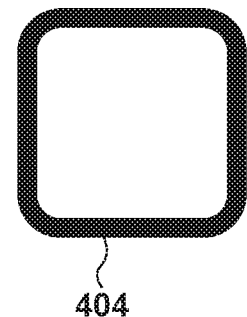
401
402    403    404

FIG. 4E

| OBJECT LUMINANCE | <Ev0 | Ev0 | Ev0.5 | Ev1 | Ev1.5 | Ev2 | Ev2.5 | Ev3 | >Ev3 |
|---|---|---|---|---|---|---|---|---|---|
| FOCUS DETECTION AREA LIGHTING-LUMINANCE (FACE NOT DETECTED) | 5 | 7 | 9 | 10 | 15 | 18 | 20 | 20 | 20 |
| FOCUS DETECTION AREA LIGHTING-LUMINANCE (FACE DETECTED) | 3 | 5 | 7 | 8 | 13 | 16 | 18 | 20 | 20 |

IMAGE CAPTURE CONTROL APPARATUS AND CONTROL METHOD THEREOF

BACKGROUND OF THE INVENTION

Field of the Invention

The present invention relates to display control for indicating an object on which predetermined processing is performed.

Description of the Related Art

With conventional image capture control apparatuses such as digital cameras, control for displaying a frame (AF frame) indicating a focus detection area on an in-finder display unit is performed, so as to enable a user to visually confirm the position on which autofocus (AF) is being performed. However, in the case where, for example, the AF frame is displayed in proximity to the face of a person serving as the object, a situation is envisioned where it is difficult to gauge the shooting timing due to the AF frame overlapping with the eyes or mouth of the face and preventing the facial expression from being confirmed.

A technology relating to display control of such an AF frame is described in Japanese Patent Laid-Open No. 2009-017121. Japanese Patent Laid-Open No. 2009-017121 proposes a technology that enlarges and displays the AF frame in a face priority AF mode so as to encompass the detected face.

However, in the case of an optical finder, the size of AF frame cannot be enlarged, thus resulting in the AF frame being displayed so as to overlap with the face with the method of Japanese Patent Laid-Open No. 2009-017121.

SUMMARY OF THE INVENTION

The present invention has been made in consideration of the aforementioned problems, and realizes a technology that prevents a reduction in visibility for a user, when display indicating a position for performing specific processing is carried out on an optical finder.

In order to solve the aforementioned problems, the present invention provides an image capture control apparatus comprising: a finder unit configured for observing an optical image of an object; a display unit having a plurality of items that overlap with the optical image and are observable through the finder unit, and capable of switching whether to light up the items or not; a detection unit configured to detect a specific object in the optical image; and a control unit configured to perform control to: light up, in the display unit, an item indicating a position for performing specific processing, among the plurality of items, light up the item in a first form, in a case where the detection unit does not detect the specific object, and light up the item in a second form in which visibility of the specific object is greater than when lighting up the item in the first form, in a case where the detection unit detects the specific object.

In order to solve the aforementioned problems, the present invention provides an image capture control apparatus comprising: a finder unit configured for observing an optical image of an object; a display unit having a plurality of items that overlap with the optical image and are observable through the finder unit, and capable of switching whether to light up the items or not; a detection unit configured to detect a specific object in the optical image; and a control unit configured to perform control to: light up an item that is at a position overlapping with an object that is to undergo specific processing, among the plurality of items, in a case where the detection unit does not detect the specific object, and not light up the item that is at a position overlapping with the object that is to undergo specific processing, and to light up an item that is at a position that does not overlap with the object and indicates a position of the object, among the plurality of items, in a case where the detection unit detects the specific object.

In order to solve the aforementioned problems, the present invention provides a control method of an image capture control apparatus having a finder unit configured for observing an optical image of an object and a display unit having a plurality of items that overlap with the optical image and are observable through the finder unit, and capable of switching whether to light up the items or not, the method comprising: detecting a specific object in the optical image; and performing control to: light up an item indicating a position for performing specific processing in a first form, among the plurality of items, in a case where the specific object is not detected, and light up the item in a second form in which visibility of the specific object is greater than when lighting up the item in the first form, in a case where the specific object is detected.

In order to solve the aforementioned problems, the present invention provides a control method of an image capture control apparatus having a finder unit configured for observing an optical image of an object and a display unit having a plurality of items that overlap with the optical image and are observable through the finder unit, and capable of switching whether to light up the items or not, the method comprising: detecting a specific object in the optical image; and performing control to: light up an item that is at a position overlapping with an object that is to undergo specific processing, among the plurality of items, in a case where the specific object is not detected, and not light up the item that is at a position overlapping with the object that is to undergo specific processing, and to light up an item that is at a position that does not overlap with the object and indicates a position of the object, among the plurality of items, in a case where the specific object is detected.

In order to solve the aforementioned problems, the present invention provides a non-transitory computer-readable storage medium storing a program for causing a computer to execute a control method of an image capture control apparatus having a finder unit configured for observing an optical image of an object and a display unit having a plurality of items that overlap with the optical image and are observable through the finder unit, and capable of switching whether to light up the items or not, the method comprising: detecting a specific object in the optical image; and performing control to: light up an item indicating a position for performing specific processing in a first form, among the plurality of items, in a case where the specific object is not detected, and light up the item in a second form in which visibility of the specific object is greater than when lighting up the item in the first form, in a case where the specific object is detected.

In order to solve the aforementioned problems, the present invention provides a non-transitory computer-readable storage medium storing a program for causing a computer to execute a control method of an image capture control apparatus having a finder unit configured for observing an optical image of an object and a display unit having a plurality of items that overlap with the optical image and are observable through the finder unit, and capable of switching whether to light up the items or not, the method comprising:

detecting a specific object in the optical image; and performing control to: light up an item that is at a position overlapping with an object that is to undergo specific processing, among the plurality of items, in a case where the specific object is not detected, and not light up the item that is at a position overlapping with the object that is to undergo specific processing, and to light up an item that is at a position that does not overlap with the object and indicates a position of the object, among the plurality of items, in a case where the specific object is detected.

According to the present invention, visibility for a user is not reduced, when display indicating a position for performing specific processing is carried out on an optical finder.

Further features of the present invention will become apparent from the following description of exemplary embodiments (with reference to the attached drawings).

BRIEF DESCRIPTION OF THE DRAWINGS

FIGS. 4A to 4E illustrate focus detection areas that are displayed on an in-finder display unit and different display forms of the focus detection areas, and show the correspondence relationship between lighting luminance for each focus detection area when a face is detected and when a face is not detected according to object luminance.

DESCRIPTION OF THE EMBODIMENTS

An exemplary embodiment of the present invention will be described in detail below with reference to the accompanying drawings.

It is to be noted that the following exemplary embodiment is merely one example for implementing the present invention and can be appropriately modified or changed depending on individual constructions and various conditions of apparatuses to which the present invention is applied. Thus, the present invention is in no way limited to the following exemplary embodiment.

Embodiments upon application of the present invention to an image capture control apparatus such as a digital single-lens reflex camera for shooting a still image and/or moving image will be described in detail hereinafter with reference to the drawings.

The external configuration and functions of a digital camera according to the present embodiment will be described below with reference to FIGS. 1 and 2A to 2B.

The internal configuration of a digital camera 100 and a lens unit 150 according to the present embodiment will be described first with reference to FIG. 1.

Figure 1:
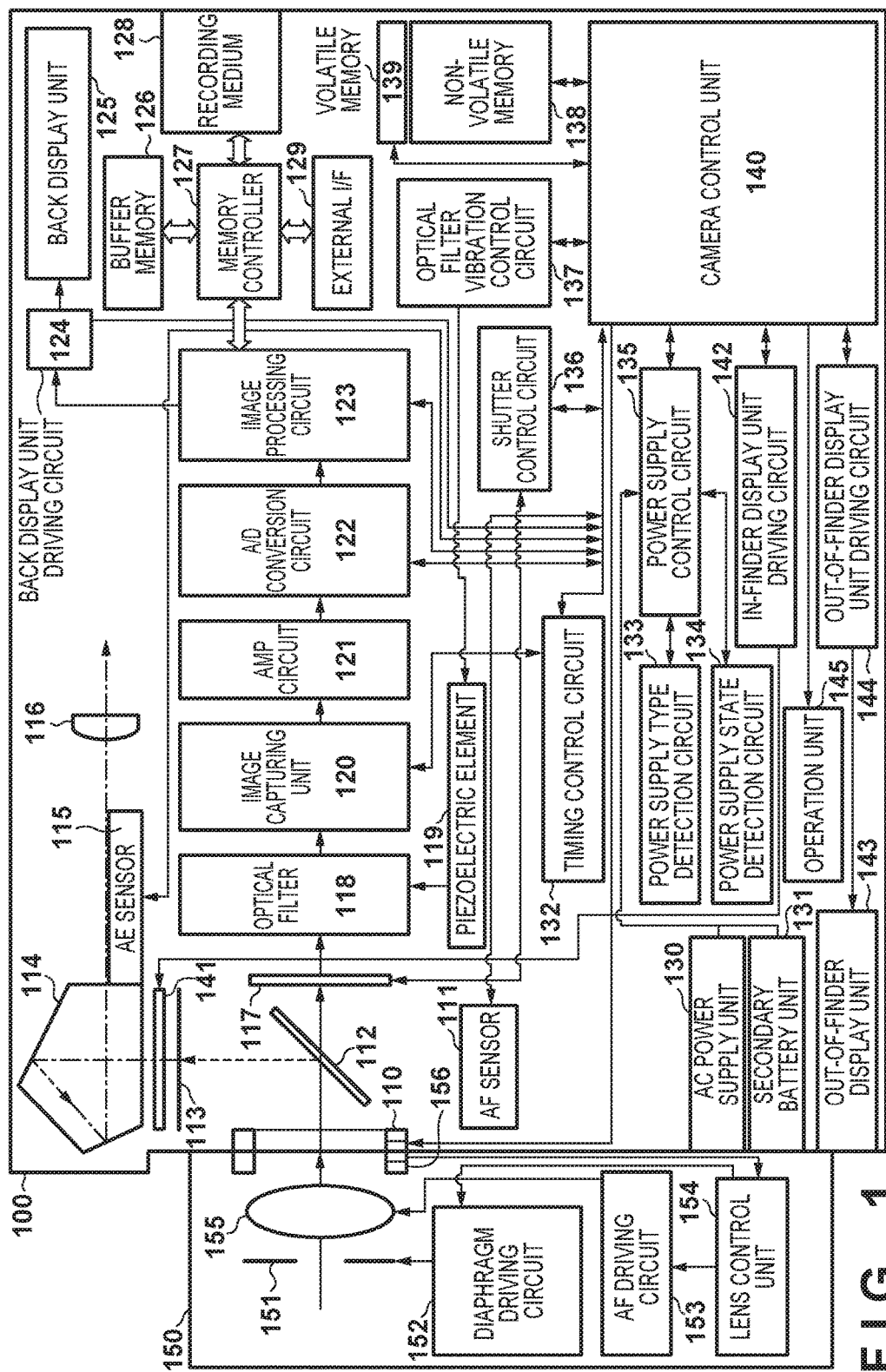
FIG. 1 shows the configuration of a digital camera of the present embodiment.

In FIG. 1, the lens unit 150 is equipped with a shooting lens 155, and is detachable from the digital camera (referred to as "camera" below) 100. The shooting lens 155 is usually constituted by a plurality of lenses, but is simplified here and is shown by one lens only. A communication terminal 156 is an electric contact for the lens unit 150 to perform communication with the camera 100. A communication terminal 110 is an electric contact for the camera 100 to perform communication with the lens unit 150. The lens unit 150 performs communication with a camera control unit 140 via the communication terminal 156, and a built-in lens control unit 154 controls a diaphragm driving circuit 152 so as to drive a diaphragm 151, and controls an AF driving circuit 153 so as to displace the position of the shooting lens 155, thereby bringing the object in focus.

An AE sensor 115 measures the luminance of the object (object light) formed as an image on a focusing screen 113 that is on a finder optical path through the lens unit 150 and a quick return mirror 112. Also, the AE sensor 115 notifies various types of information obtained from the object to the camera control unit 140. The camera control unit 140 controls the lens unit 150 based on the luminance of the object to perform AE (automatic exposure) processing.

An AF sensor 111 outputs information relating to a defocusing amount to the camera control unit 140, and the camera control unit 140 controls the lens unit 150 according to the defocusing amount to perform AF (autofocus) processing.

The quick return mirror 112 receives an instruction from the camera control unit 140 at the time of exposure, live view display, and moving image shooting, and is driven to the upward position or the downward position by an actuator (not illustrated). The quick return mirror 112 switches luminous flux entering the shooting lens 155 to an eyepiece finder 116 or an image capturing unit 120. The quick return mirror 112 is usually biased toward the downward position so as to reflect the luminous flux and guide the luminous flux to the eyepiece finder 116, but for exposure and live view display, jumps upward and recedes from the luminous flux (to the upward position) so as to guide the luminous flux to the image capturing unit 120. In addition, the central portion of the quick return mirror 112 is a half mirror such that a portion of the luminous flux passes through and enters the AF sensor 111. The photographer can observe the focus and composition of the optical image of the object taken in through the lens unit 150 by observing the optical image formed on the focusing screen 113, via a pentagonal prism 114 and the eyepiece finder 116 (of an eyepiece unit).

An in-finder display unit 141 is disposed on the finder optical path, and displays a frame (focus detection frame) showing focus detection areas (focus detection positions/focus detection regions) on which AF processing is currently being performed, icons representing the setting state of the camera and the like, via an in-finder display unit driving circuit 142. The focusing screen 113 and the in-finder display unit 141 are in proximal positions, and are disposed in a stacked manner so as to enable both displays to be checked at the one time.

A focal plane shutter 117 can freely control the exposure time of the image capturing unit 120 in accordance with an instruction from the camera control unit 140.

An optical filter 118 is constituted by a low pass filter or the like, and is configured to cut the high frequency component of light that enters through the focal plane shutter 117 and guide the light for an object image (optical image) to the image capturing unit 120.

The image capturing unit 120 is an image sensor constituted by an imaging element such as a CCD or a CMOS for converting the optical image of an object into electrical signals.

An AMP circuit 121 amplifies shooting signals with gain that depends on a preset shooting sensitivity, with respect to the electrical signals generated by the image capturing unit

120. An A/D conversion circuit 122 converts analog signals output from the image capturing unit 120 into digital signals and generates image data.

An image processing circuit 123 performs filter processing, color conversion processing and gamma/knee processing on the image data converted into digital signals by the A/D conversion circuit 122, and outputs the resultant data to a memory controller 127. Also, the image processing circuit 123 has a built-in D/A conversion circuit. The image processing circuit 123 is also able to convert the image data converted into digital signals by the A/D conversion circuit 122 and image data that is input from the memory controller 127 into analog signals and output the analog signals to a back display unit 125 via a back display unit driving circuit 124. The image processing and the display processing by the image processing circuit 123 are switched by the camera control unit 140. Also, the camera control unit 140 performs white balance adjustment on the basis of color balance information of the live view image.

The back display unit 125 is a liquid crystal panel for displaying images. The back display unit 125 is not limited to a liquid crystal panel as long as the device displays images, and may be a display employing another method such as organic EL.

The memory controller 127 stores unprocessed image data input from the image processing circuit 123 in a buffer memory 126, and stores image data that has undergone image processing in a recording medium 128. The memory controller 127 is also able to import image data from the buffer memory 126 or the recording medium 128, and output the imported image data to the image processing circuit 123. Also, the memory controller 127 is capable of storing image data sent via an external interface 129 in the recording medium 128, and outputting image data that is stored in the recording medium 128 to the outside via the external interface 129. As the external interface, interfaces such as USB, IEEE and HDMI (registered trademark) are given as examples. The recording medium 128 is a recording medium that is removable from the camera main body such as a memory card, but may also be an internal memory.

The camera control unit 140 controls the drive timing of the image capturing unit 120 via a timing control circuit 132.

A power supply control circuit 135 is a circuit that is supplied power from an AC power supply unit 130 or a secondary battery unit 131, and controls the power supply. The power supply control circuit 135 turns the power supply on/off in response to an instruction from the camera control unit 140. Also, the power supply control circuit 135 notifies information on the current power supply state detected by a power supply state detection circuit 134 and information on the current type of power supply detected by a power supply type detection circuit 133 to the camera control unit 140.

The camera control unit 140 controls the focal plane shutter 117 via a shutter control circuit 136.

An optical filter vibration control circuit 137 is a circuit that vibrates a piezoelectric element 119 that is connected to the optical filter 118. The optical filter vibration control circuit 137 vibrates the piezoelectric element 119 in accordance with an instruction from the camera control unit 140, such that the amplitude of vibration, the vibration time, and the axial direction of vibration respectively achieve prescribed values.

A nonvolatile memory 138 is, for example, an EEPROM, which is electrically erasable and recordable.

In the nonvolatile memory 138, constants and programs, for example, for operating the camera control unit 140 are stored. In this context, "programs" may refer to programs for executing various flowcharts that will be described later.

A volatile memory 139 is, for example, a RAM and is used also as a work memory where constants and variables for operating the camera control unit 140, and the programs read out from the nonvolatile memory 138 are extracted.

Various setting values of the camera such as a shutter speed and a diaphragm aperture are displayed on an out-of-finder display unit 143 via an out-of-finder display unit driving circuit 144.

An operation unit 145 is an input unit which accepts and notifies user operations to the camera control unit 140, and includes at least the following operation members: a shutter button 201, a main electronic dial 202, a sub electronic dial 203, a power supply switch 204, a protection button 205, a menu button 206, a deletion button 207, an enlargement mode button 208, a reproduction button 209, a focus detection area selection button 210 and a multi-controller 211.

The camera control unit 140 includes a CPU or an MPU for performing overall control of the entire camera 100, and realizes, by executing the programs stored in the nonvolatile memory 138, the procedures of the flowchart that will be described later.

The external configuration of the camera 100 according to the present embodiment will be described next with reference to FIGS. 2A and 2B.

Figure 2A:
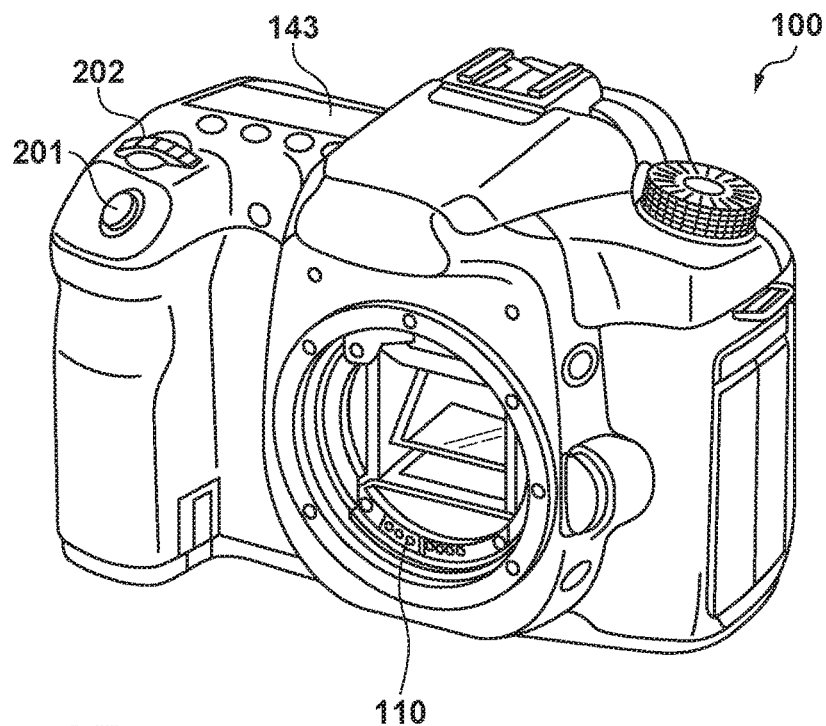
FIGS. 2A and 2B show the outer appearance of a digital camera of the present embodiment.
Figure 2B:
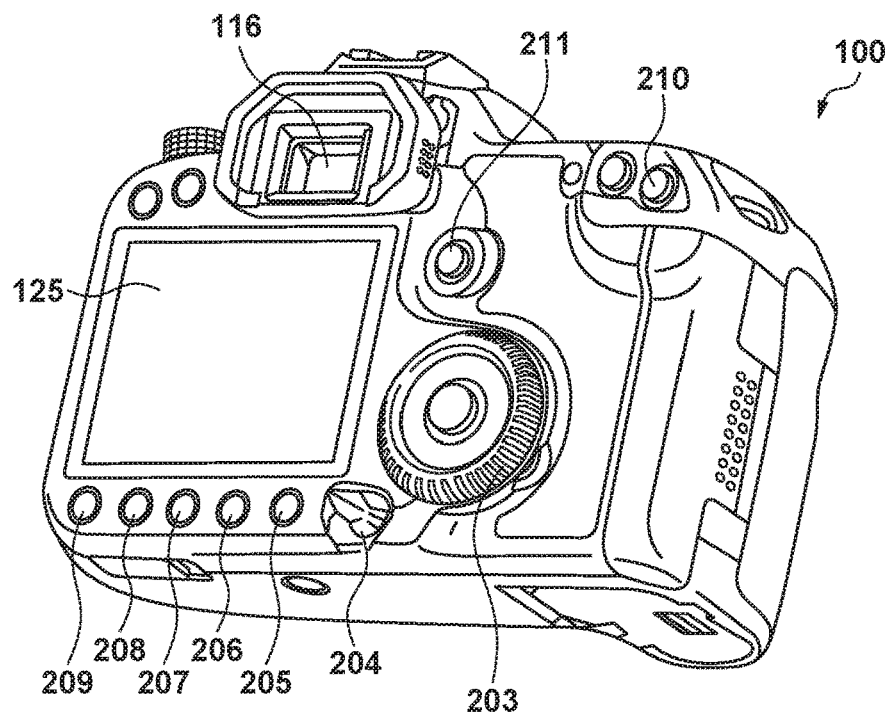

FIG. 2A is a front perspective view of the camera 100, and FIG. 2B is a back perspective view of the camera 100. In FIGS. 2A and 2B, constituent elements in common with FIG. 1 are shown with same reference signs.

The shutter button 201 is an operation member for giving a shooting preparation instruction and a shooting instruction. When the shutter button 201 is half-pressed, the camera control unit 140 starts shooting preparation processing such as AF (Automatic Focus) processing, AE (Automatic Exposure) processing, AWB (Automatic White Balance) processing and the like. When the shutter button 201 is full-pressed, the camera control unit 140 starts a series of shooting processing from reading out of signals from the image capturing unit 120 to writing of image data to the recording medium 128.

The main electronic dial 202 is a rotating operation member included in the operation unit 145, and the user, by rotating this main electronic dial 202, is able to change setting values such as a shutter speed and a diaphragm aperture and to finely adjust an enlargement magnification in the enlargement mode.

The sub electronic dial 203 is a rotating operation member included in the operation unit 145, and the user, by rotating this sub electronic dial 203, is able to change setting values such as a diaphragm aperture and an exposure correction and to perform a single image scrolling operation in an image display state.

The power supply switch 204 is an operation member for switching the power supply to the camera 100 on/off. The protection button 205 is an operation member for performing processing such as protection and rating on image data that is saved in the recording medium 128.

The menu button 206 is an operation member for displaying menu screens that enable various settings on the back display unit 125.

The deletion button 207 is an operation member for instructing deletion of image data that is saved in the recording medium 128. The enlargement mode button 208 is an operation member that, in a reproduction state, accepts an instruction for transitioning to the enlargement mode (start instruction for the enlargement mode) and an instruction for transitioning from the enlargement mode (end instruction for the enlargement mode).

The reproduction button 209 is an operation member that causes the back display unit 125 to display image data that is saved in the recording medium 128. A focus detection area selection button 210 is an operation member for transitioning to a mode for selecting a focus detection area which is the start position of autofocus.

The multi-controller 211 is an operation member that is operable in a plurality of directions for performing setting of a focus detection area which is the start position of autofocus and movement of an expanded frame (expanded range) in an expanded image display state.

A WB/photometry mode selection button 213 is an operation member for transitioning to a mode for selecting a WB and photometry mode. In the case where the camera 100 is in this mode, change in a photometry mode is performed when the main electronic dial 202 is operated, and change in a WB mode is performed when the sub electronic dial 203 is operated.

Here, the face detection method will be described. With the abovementioned digital camera 100, shooting that uses center single-point AF or face AF is possible. Center single-point AF involves performing AF on a single point in a center position within the shooting screen. Face AF involves performing AF on a face within the shooting screen detected by a face detection function.

The face detection function will now be described. The camera control unit 140 sends image data that is to undergo face detection to the image processing circuit 123. The image processing circuit 123 causes a horizontal band pass filter to operate on the processed image data under the control of the camera control unit 140. Also, the image processing circuit 123 causes a vertical band pass filter to operate on the processed image data under the control of the camera control unit 140. An edge component is detected from the image data, using these horizontal and vertical band pass filters.

Thereafter, the camera control unit 140 performs pattern matching in relation to the detected edge component, and extracts candidate groups for eyes, nose, mouth and ears. The camera control unit 140 then judges eyes that satisfy a preset condition (e.g., distance between two eyes, inclination of two eyes, etc.) out of the extracted candidate groups for eyes to be a pair of eyes, and narrows the candidate groups down to only those having pairs of eyes as the candidate groups for eyes. The camera control unit 140 then detects faces by associating the candidate groups for eyes that were narrowed down with other parts (nose, mouth, ears) forming the faces corresponding thereto, and passing the resultant data through a preset non-face conditional filter. The camera control unit 140 outputs the face information according to the face detection result, and ends the processing. At this time, a feature amount such as the number of faces is stored in a volatile memory 139. Size information, position information and the like of the detected faces are also detected.

Object information is detectable by performing image analysis of image data that is displayed through live view or displayed through reproduction and extracting feature amounts of the image data as mentioned above. Although face information was given as an example of object information in the present embodiment, object information additionally includes various information obtained by redeye determination, eye detection, closed eye detection, smile detection and the like.

Note that face AE, face FE and face WB can be performed at the same time as face AF. Face AE involves optimizing exposure of the entire screen according to the brightness of the detected face. Face FE involves performing light modulation of the flash centered around the detected face. Face WB involves optimizing WB of the entire screen according to the color of the detected face.

FIG. 4A is an image diagram representing the relationship between displayed focus detection areas and coordinate positions. The focus detection areas are disposed so as to be aligned along the horizontal axis and the vertical axis in the in-finder display unit 141, and have respectively corresponding coordinate positions. An item lights up when a position (object) of each focus detection area is brought into focus. The user is able to visually confirm the object on a finder unit, in a state where an item at the position of each focus detection area overlaps with the object which can be visually confirmed via the shooting lens 155. Therefore, the user is able to check whether the desired object is in focus and whether the shooting timing is favorable. FIGS. 4B to 4D show enlarged views of an item indicating each focus detection area shown in FIG. 4A.

FIG. 4B shows a focus detection area constituted by two items consisting of an inner first portion and an outer second portion that can light up separately. An inner item 401 and an outer item 402 that are shown with dotted lines are items (segments, elements) each of which is capable of switching whether to light up or not. FIG. 4B shows the item with dotted lines for the purpose of description. FIG. 4C is exemplary display in the case where only the inner item 401 lights up, and FIG. 4D is exemplary display in the case where the inner and outer items 401 and 402 both light up. Because the inner item 401 and the outer item 402 can respectively light up in this manner, the thickness of the display indicating the focus detection area can be changed. Also, FIG. 4E is a table showing the relationship between luminance when the items are on and object luminance.

Note that data showing the relationship between the focus detection areas and coordinate positions of FIG. 4A and the item data of FIGS. 4B to 4D are stored in the nonvolatile memory 138. The camera control unit 140, when performing focus detection area display processing which will be discussed later with FIGS. 3A and 3B, reads out the data of FIGS. 4A to 4D from the nonvolatile memory 138, and holds the read data in the volatile memory 139 in a referenceable manner.

Figure 3A:
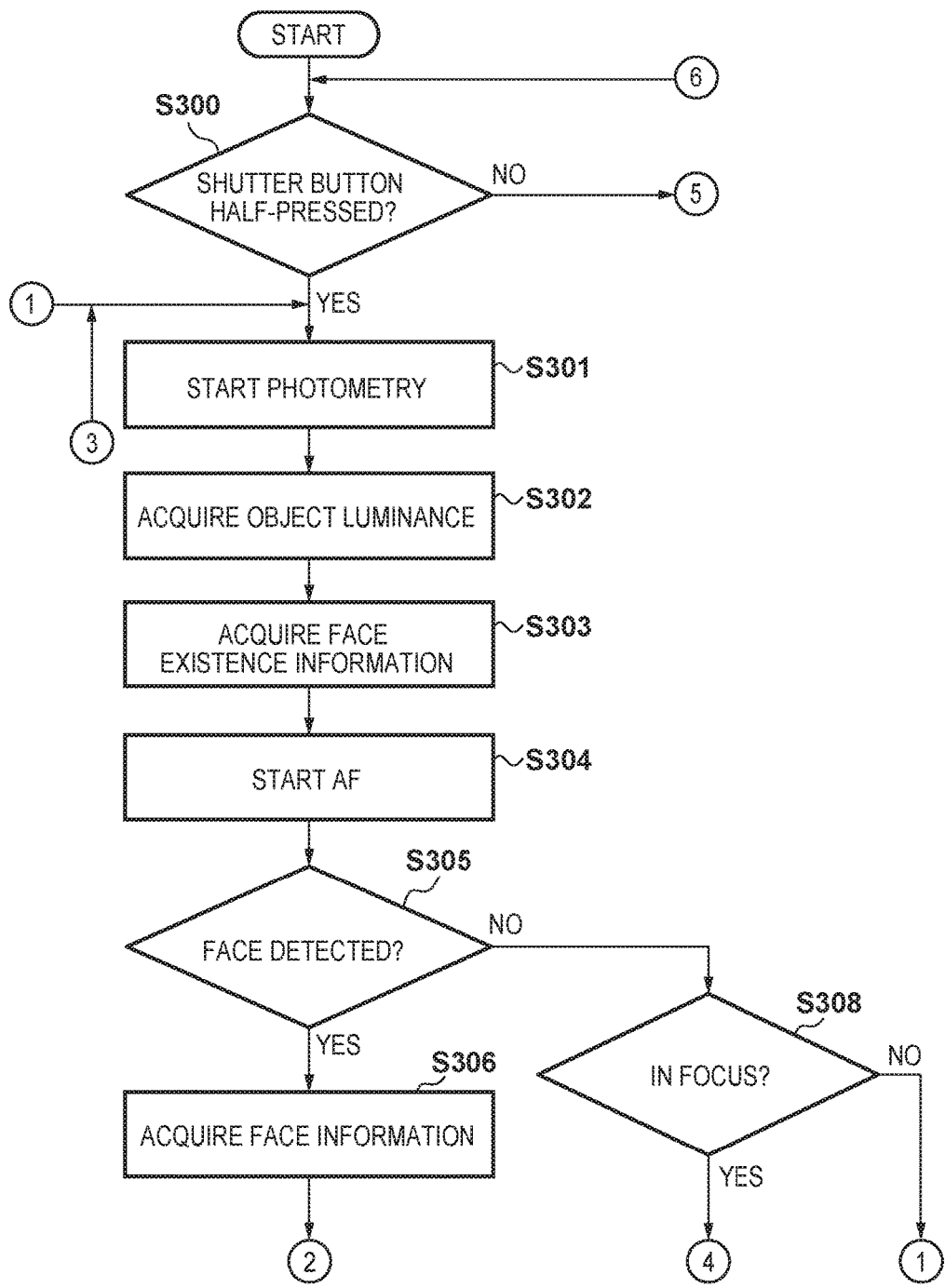
FIGS. 3A and 3B are flowcharts showing shooting processing including focus detection area display processing of the present embodiment.
Figure 3B:
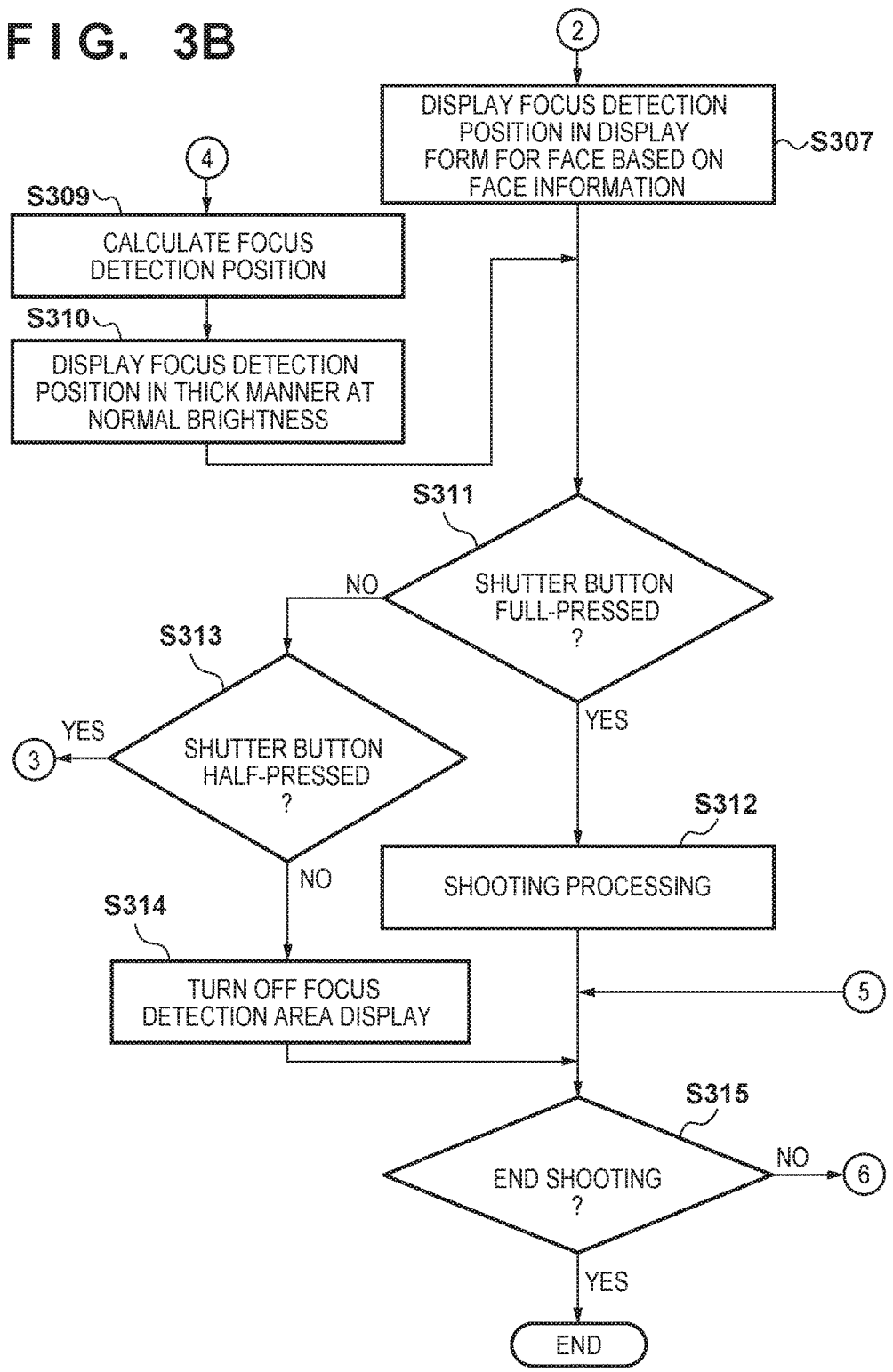

Next, display processing of focus detection areas in the present embodiment will be described using FIGS. 3A and 3B. The processing of FIGS. 3A and 3B is started when the power supply is turned on in the digital camera 100, and display is enabled on the in-finder display unit 141. This processing is realized as a result of a program recorded in the nonvolatile memory 138 being extracted in the volatile memory 139 and the camera control unit 140 executing the program. The camera 100 of the present embodiment is capable of shooting in a finder display mode that uses a contrast method, a phase difference method or the like as an AF method.

In step S300, the camera control unit 140 determines whether the shutter release 201 is half-pressed, and the camera control unit 140 advances the processing to step S301 if half-pressed, and ends the processing if this is not the case.

In step S301, the camera control unit 140 controls the AE sensor 115 to start photometry processing (luminance detection) and face detection processing (shooting preparation processing).

In step S302, the camera control unit 140 acquires luminance information of an object (face) from the AE sensor 115, as a result of the photometry processing at step S301.

In step S303, the camera control unit 140 acquires face existence information from the AE sensor 115, as a result of the face detection processing at step S301.

In step S304, the camera control unit 140 controls the AF sensor 111 to start AF processing.

In step S305, the camera control unit 140 advances the processing to step S306 if a face is detected and advances the processing to step S308 if a face is not detected, based on the face existence information acquired at step S303.

In step S306, the camera control unit 140 acquires face information including information on the position of focus detection areas corresponding to the face position detected in step S305 and information on size and object luminance.

In step S307, the camera control unit 140 performs display (display of focus detection area for face) showing that the detected face is in focus. When the focus detection areas are displayed in the manner of item 404 in FIG. 4D in the case where a face is detected and brought into focus, the face of the object that the photographer is trying to bring into focus is hidden, and although it is clear that the object is in focus, the expression or appearance of the object is difficult to discern. After taking a photo, the photographer will check whether the object's eyes were shut and whether the expression was satisfactory, and will have to take the photo again in the case where the object is not in a desired state. There is also a possibility that the shooting timing was out, ultimately resulting the shooting timing being missed. Therefore, in the case where a face is detected and furthermore brought into focus, display is performed such that display showing the focus detection areas is lightly displayed and such that lines are thinly displayed so as to not overlap with the face, such that the expression and facial appearance of the object is easy to discern. That is, the focus detection areas are displayed such that the visibility of the focused object (face) is higher than when an object other than a face is in focus.

The in-finder display unit 141 is disposed on the finder optical path, and the optical image of the object obtained through the lens unit 150 and the focus detection areas overlap and can be seen by the user looking through the finder. Although the position of the object and the size of the face within the optical image changes, the focus detection areas that can be displayed in the in-finder display unit 141 are decided in advance as shown in FIG. 4A, and the focus detection areas are shown to the user by controlling whether to light up those focus detection areas or not.

In order to prevent display of the focus detection areas overlapping with the face and making the expression difficult to see on such a liquid crystal display screen, focus detection areas that overlap with the face may be displayed (lighted up) but in a manner that allows the expression to be seen more clearly. Alternatively, a configuration can be adopted that enables the user to confirm that the face of the object is in focus by displaying (turning on) the focus detection areas surrounding the face but not displaying the focus detection areas that overlap with the face. In this way, even with limited display items, the expression on the face of an object can be prevented from becoming difficult to discern, by changing the method of display in the case where a face is detected. Note that, apart from displaying lines thinly, a configuration may be adopted, in the case where an icon indicating a focus detection area lights up, in which the four corners of the icon light up or a portion of the line of the icon lights up, such that the region that overlaps with the face is small.

Note that even if the face is detected in step S305, the processing returns to step S301 in the case where the detected face is not in focus (could not be brought into focus), and shooting preparation processing is continued. In other words, in the case where the detected face is in focus, the display form of the focus detection areas is changed from that when an object other than a face is in focus, and in the case where the detected face is not in focus, nothing is displayed. To rephrase again, display indicating the focusing position differs between when a face is detected and when a face is not detected, and display is performed such that the user can easily see the appearance of the focusing target in the case where a face is detected.

Here, a specific example of display processing of focus detection areas for a face in step S307 and display processing of focus detection areas for an object other than a face in step S310 will be described.

In the case where a face is detected in step S305, face information including information on the position of focus detection areas corresponding to the position of the face and information on size and object luminance are acquired in step S306, and display showing focus detection areas for the face is performed in step S307. The expression on a face can be difficult to see when display showing the focus detection areas is displayed in the usual manner (as shown in FIG. 4D) at the time of indicating that the position of the face is in focus. Therefore, in the case where a face is detected, the line of the focus detection area 403 is displayed thinner than the usual focus detection area 404, by lighting up only the item 401 and not lighting up the item 402 as shown in FIG. 4C. As exemplary display of focus detection areas in the case where a face is detected (examples in which items light up), apart from making the line thinner, there are methods that involve reducing luminance or changing the display position to different focus detection areas whose display position does not overlap with the face.

FIGS. 5A to 5E show examples of actual display of focus detection areas on the in-finder display unit 141. FIGS. 5A to 5D show exemplary display in the case where the face of an object U, which is a person, is detected.

Figure 5A:
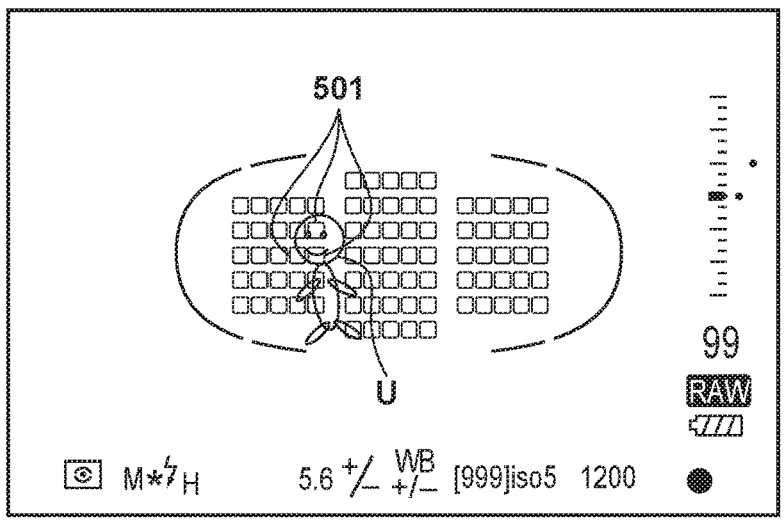
FIGS. 5A to 5E show exemplary display of focus detection areas when a face is detected and exemplary display of focus detection areas when a face is not detected.

Focus detection areas 501 shown in FIG. 5A are focus detection areas corresponding to the position where the face is detected, and a state in which the item 401 and the item 402 are displayed at a lower luminance than usual is shown. As shown in FIG. 4E, the luminance of the items 401 and 402 increases as the luminance of the object increases, in both the case where a face is detected and a face is not detected. Even if the object luminance is the same, in the case where a face is detected, the expression on the detected face is made easier to discern by reducing the luminance of the item 401 and the item 402 to lower than in the case where a face is not detected.

Figure 5B:
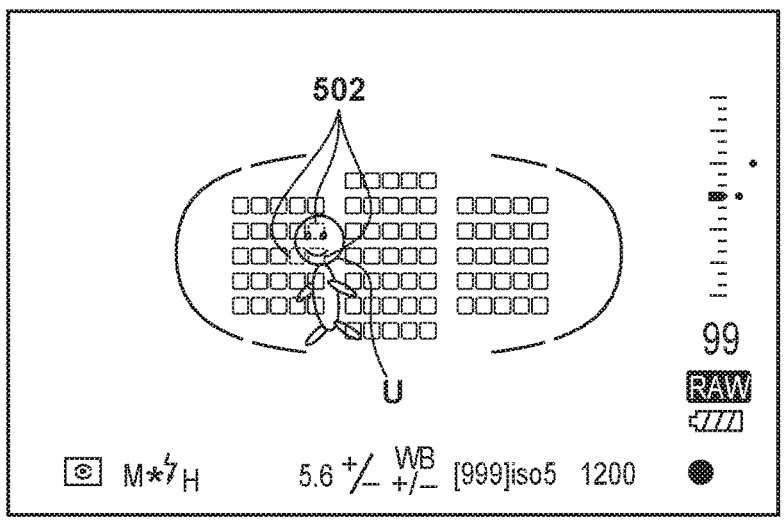

Focus detection areas 502 shown in FIG. 5B are focus detection areas corresponding to the position where a face is detected, and a state in which only the item 401 is displayed with the thin line is shown. At this time, the luminance when the item 401 lights up may be the same as the luminance when the focus detection areas light up in the case where a face is not detected or may be displayed at a reduced luminance.

Figure 5C:
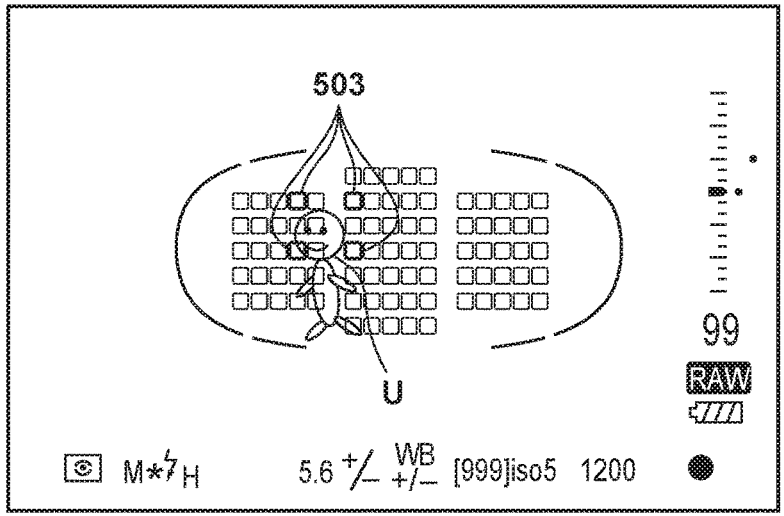

Focus detection areas 503 shown in FIG. 5C are focus detection areas showing the area in which a face is detected, and a state in which the item 401 and the item 402 of focus detection areas in the region around the region where the face was detected light up is shown. At this time, the luminance of the item 401 and the item 402 may be the same as in the case where a face is not detected or the luminance may be reduced. Also, a configuration may be adopted in which only the item 401 lights up. Even in the case where the focus detection areas that overlap with the face do not light up, by performing display at a lower luminance or with thinner lines, the user becomes less likely to feel dazzled by the focus detection areas that light up, and the expression on the face of the object becomes easier to see. FIG. 5C illustrates a state in which four corner focus detection areas shifted outwardly in four directions from the center of the face region light up, although a configuration may be adopted in which focus detection areas upward and downward and to the left and right of the region of the face light up such as focus detection areas 504 shown in FIG. 5D.

Figure 5D:
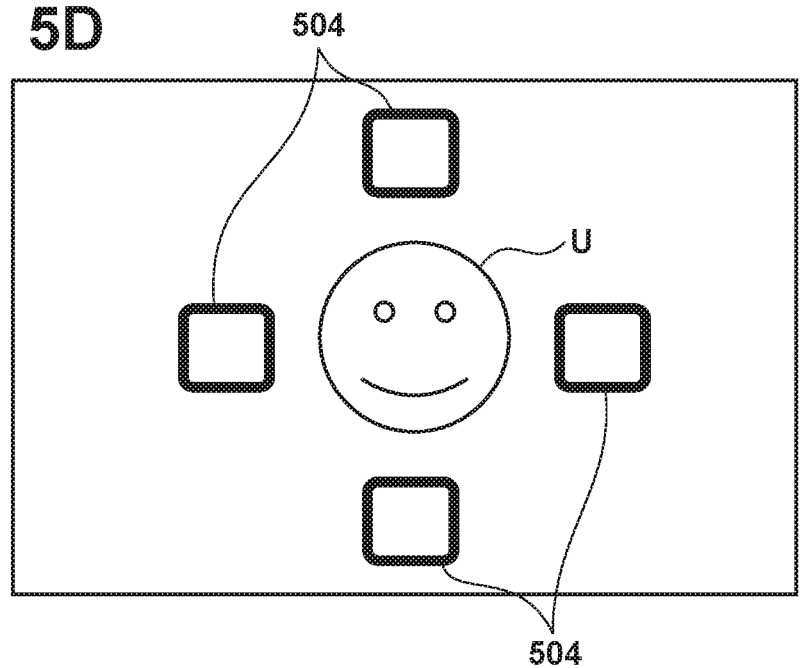
Figure 5E:
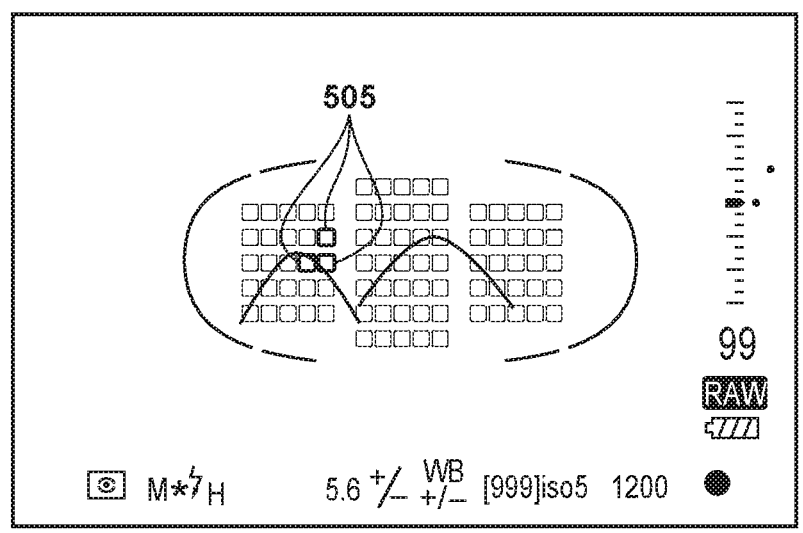

FIG. 5E shows an example of lighting up the focus detection areas in step S310 in the case where it is determined to be NO in step S305 (face not detected) and it is determined to be in focus in step S308. In FIG. 5E, an object that is not a person is acquired by the image capturing unit, and the appearance of the focus detection areas in the case where a face is not detected is shown. Focus detection areas 505 show the positions of focus detection areas focused by the AF processing started in step S304. At this time, the item 401 and the item 402 of the focus detection areas 505 are on, and the lighting luminance is displayed brighter than the luminance of the items in the case where a face is detected as shown in FIG. 5E.

Returning to the description of FIG. 3A, in step S308, the camera control unit 140 determines whether a predetermined object is in a focused state as a result of performing AF processing at step S304, and advances the processing to step S309 if in a focused state, and advances the processing to step S301 if not in a focused state.

In step S309, the camera control unit 140 calculates the focus detection areas (focus detection positions) of the object in the focused state.

In step S310, the camera control unit 140 displays the focus detection areas (focus detection positions) calculated at step S309 at normal brightness and thickness. That is, as with the focus detection areas 505 shown in FIG. 5E, the item 401 and the item 402 are displayed, and, furthermore, display is performed at the luminance for when a face is not detected in FIG. 4E according to the luminance of the object. In the case of the same object luminance, the items are displayed at a higher luminance in the case where a face is not detected. In the case where, however, the luminance of the object is at or above Ev3, items are displayed at a high luminance irrespective of the face detection state. In the case where a face is not detected, the appearance of the object will be unlikely to have changed greatly from when the user checked the appearance and gave the focus instruction. Also, because any change will likely be smaller than with a facial expression, display is performed so as to allow the user to more easily visually confirm the focus detection areas. That is, in the case where an object other than a face is in focus, the appearance of the object will be unlikely to change greatly depending on the shooting timing, and raising the visibility of focus detection areas results in display (high visibility) that is more intelligible for the user.

In step S311, the camera control unit 140 determines whether the shutter release 201 was full-pressed, and advances the processing to step S312 if full-pressed, and advances the processing to step S313 if not full-pressed. In step S312, the camera control unit 140 performs shooting processing.

In step S313, the camera control unit 140 determines whether a state in which the shutter release 201 is half-pressed is continuing, and returns the processing to step S301 and continues shooting preparation processing if the half-pressed state is continuing and advances the processing to step S314 if not continuing.

In step S314, the camera control unit 140 hides the focus detection areas displayed at step S307 or step S310. In step S315, the camera control unit 140 determines whether a shooting end operation (operation for turning the power supply off, operation for transitioning to a reproduction mode, etc.) was performed. The processing returns to step S300 in the case where a shooting end operation has not been performed, and the processing is ended in the case where a shooting end operation has been performed.

Note that the focus detection areas that are displayed on the periphery of the face are not limited in number to four, and also may be displayed in a diamond pattern as shown in FIG. 5D or may be displayed with thin lines or bright luminance as shown in FIG. 5A or FIG. 5B, rather than in a square pattern as shown in FIG. 5C.

Note that although the abovementioned embodiments described control for displaying focus detection areas on an object targeted for AF, the present invention is not limited to this and is applicable to various processing. For example, the present invention is also applicable in the case of displaying a target position at the time of performing processing such as AE (automatic exposure, automatic exposure setting) and AWB (automatic white balance). The present invention is also applicable in the case of displaying a tracking target.

Note that a single item of hardware may control the camera control unit 140, or the entire apparatus may be controlled by a plurality of items of hardware sharing processing.

Although the present invention has been elaborated above based on suitable embodiments thereof, the present invention is by no means limited to these specific embodiments and includes various modifications without departing from the concept of the present invention. The above embodiments are merely illustrative embodiments of the present invention, and may be combined where appropriate.

Also, although, in the abovementioned embodiments, an example in which the image capture control apparatus of the present invention was applied to a digital single-lens reflex camera equipped with an AF function was described, the present invention is not limited to this, and is applicable to any apparatus that displays guidance indicating a position for performing predetermined processing on an image. That is, the present invention is also applicable to a personal computer, a tablet terminal, a mobile phone terminal, a smartphone, a PDA (Personal Digital Assistant), a portable image viewer, a music player, a game machine, an electronic book reader, a printer, a scanner, and a facsimile. Furthermore, the present invention is also applicable to office equipment, medical equipment and the like equipped with functions such as a copier. The image capture control apparatus of the present invention is also applicable to a mobile phone, a smartphone, a tablet PC, a desktop PC, or the like that receives and displays live view images captured with an image capturing apparatus such as a digital camera, via wired or wireless communication, and can give a shooting instruction to a digital camera (including a network camera) by remote operation.

Other Embodiments

Embodiment(s) of the present invention can also be realized by a computer of a system or apparatus that reads out and executes computer executable instructions (e.g., one or more programs) recorded in a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-188756, filed Sep. 27, 2016, which is hereby incorporated by reference herein in its entirety.

What is claimed is:

1. An image capture control apparatus comprising:
a finder unit configured for observing an optical image of an object;
a display unit having a plurality of items that overlap with the optical image and are observable through the finder unit, and capable of switching whether to light up the items or not;
at least one memory and at least one processor which function as:
a detection unit configured to detect a specific object in the optical image; and
a control unit configured to perform control to:
light up, in the display unit, an item indicating a position for performing specific processing, among the plurality of items,
light up the item in a first form, in a case where the detection unit does not detect the specific object, and
light up the item in a second form in which visibility of the specific object is greater than when lighting up the item in the first form, in a case where the detection unit detects the specific object,
wherein the control unit performs control to display the item at a lower luminance than in the first form, in the case where the detection unit detects the specific object.

2. The apparatus according to claim 1, wherein
the control unit performs control to light up the item of a position that overlaps with the position where the specific processing of the optical image is performed among the plurality of items.

3. The apparatus according to claim 1, wherein
the control unit performs control to display the item in a thin manner, in the case where the detection unit detects the specific object.

4. The apparatus according to claim 1, wherein
the control unit performs control to not light up the item, in a case where the specific processing cannot be performed on the specific object, even if the detection unit detects the specific object.

5. The apparatus according to claim 1, wherein
the specific object is a face of a person.

6. The apparatus according to claim 1, wherein
the items indicate focus detection areas, and
the specific processing is autofocus.

7. The apparatus according to claim 1, further comprising an image capturing unit configured to capture an image.

8. The apparatus according to claim 1, wherein
in the display unit, the plurality of items are disposed to be aligned along a horizontal axis and a vertical axis of the display unit.

9. The apparatus according to claim 1, wherein the at least one memory and the at least one processor function as an acceptance unit configured to accept an instruction for performing the specific processing,
wherein the control unit performs control to light up the item in response to the acceptance unit having accepted the instruction and the specific processing having been performed.

10. The apparatus according to claim 9, further comprising a shutter release,
wherein the control unit performs control such that the acceptance unit receives the instruction in response to the shutter release being half-pressed, and shooting is performed in response to the shutter release being full-pressed.

11. The apparatus according to claim 1, wherein
the items disposed in the display unit each include at least a first portion and a second portion, and the first portion and second portion of the items are able to light up separately.

12. The apparatus according to claim 1, wherein the at least one memory and the at least one processor function as
a luminance detection unit configured to detect luminance of the optical image,
wherein the control unit performs control such that items in the display unit light up at a luminance that is based on the luminance of the optical image detected by the luminance detection unit.

13. An image capture control apparatus comprising:
a finder unit configured for observing an optical image of an object;
a display unit having a plurality of items that overlap with the optical image and are observable through the finder unit, and capable of switching whether to light up the items or not;
at least one memory and at least one processor which function as:
a detection unit configured to detect a specific object in the optical image; and
a control unit configured to perform control to:
light up, in the display unit, an item indicating a position for performing specific processing, among the plurality of items,
light up the item in a first form, in a case where the detection unit does not detect the specific object, and light up the item in a second form in which visibility of the specific object is greater than when lighting up the item in the first form, in a case where the detection unit detects the specific object, wherein the control unit performs control to light up the item such that a region of the item that overlaps with the specific object is smaller than in the first form, in the case where the detection unit detects the specific object.

14. A control method of an image capture control apparatus having a finder unit configured for observing an optical image of an object and a display unit having a plurality of items that overlap with the optical image and are observable through the finder unit, and capable of switching whether to light up the items or not, the method comprising:

detecting a specific object in the optical image; and
performing control to:
light up an item indicating a position for performing specific processing in a first form, among the plurality of items, is a case where the specific object is not detected, and
light up the item in a second form in which visibility of the specific object is greater than when lighting up the item in the first form, in a case where the specific object is detected,
wherein the performing step performs control to display the item at a lower luminance than in the first form, in the case where the detection unit detects the specific object.

15. A non-transitory computer-readable storage medium storing a program for causing a computer to execute a control method of an image capture control apparatus having a finder unit configured for observing an optical image of an object and a display unit having a plurality of items that overlap with the optical image and are observable through the finder unit, and capable of switching whether to light up the items or not, the method comprising:

detecting a specific object in the optical image; and
performing control to:
light up an item indicating a position for performing specific processing in a first form, among the plurality of items, in a case where the specific object is not detected, and
light up the item in a second form in which visibility of the specific object is greater than when lighting up the item in the first form, in a case where the specific object is detected,
wherein the performing step performs control to display the item at a lower luminance than in the first form, in the case where the detection unit detects the specific object.

16. A control method of an image capture control apparatus having a finder unit configured for observing an optical image of an object and a display unit having a plurality of items that overlap with the optical image and are observable through the finder unit, and capable of switching whether to light up the items or not, the method comprising:

detecting a specific object in the optical image; and
performing control to:
light up, in the display unit, an item indicating a position for performing specific processing, among the plurality of items,
light up the item in a first form, in a case where the detecting step does not detect the specific object, and
light up the item in a second form in which visibility of the specific object is greater than when lighting up the item in the first form, in a case where the detecting step detects the specific object,
wherein the performing step performs control to light up the item such that a region of the item that overlaps with the specific object is smaller than in the first form, in the case where the detecting step detects the specific object.

17. A non-transitory computer-readable storage medium storing a program for causing a computer to execute a control method of an image capture control apparatus having a finder unit configured for observing an optical image of an object and a display unit having a plurality of items that overlap with the optical image and are observable through the finder unit, and capable of switching whether to light up the items or not, the method comprising:

detecting a specific object in the optical image; and
performing control to:
light up, in the display unit, an item indicating a position for performing specific processing, among the plurality of items,
light up the item in a first form, in a case where the detecting step does not detect the specific object, and
light up the item in a second form in which visibility of the specific object is greater than when lighting up the item in the first form, in a case where the detecting step detects the specific object,
wherein the performing step performs control to light up the item such that a region of the item that overlaps with the specific object is smaller than in the first form, in the case where the detecting step detects the specific object.

* * * * *